United States Patent Office 3,544,669
Patented Dec. 1, 1970

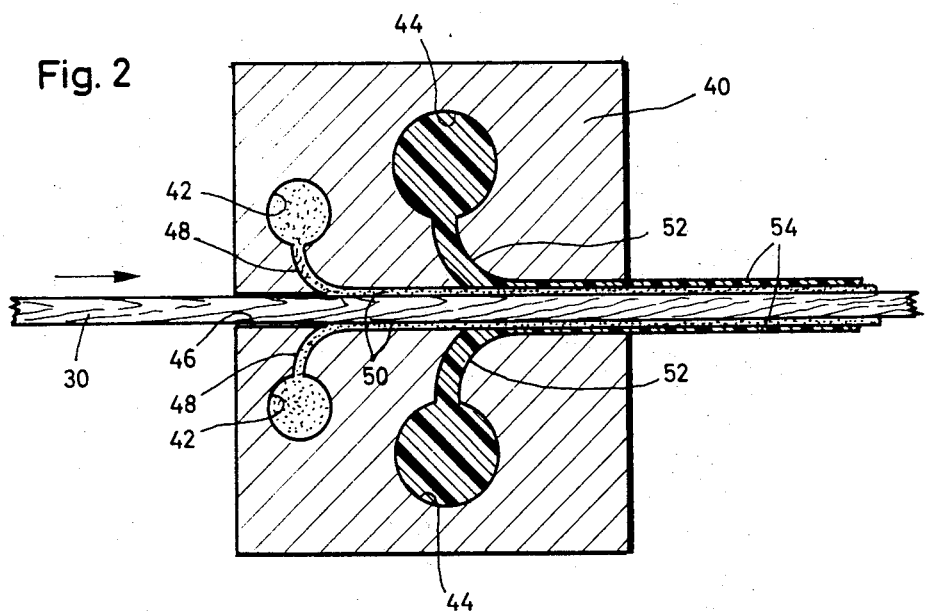
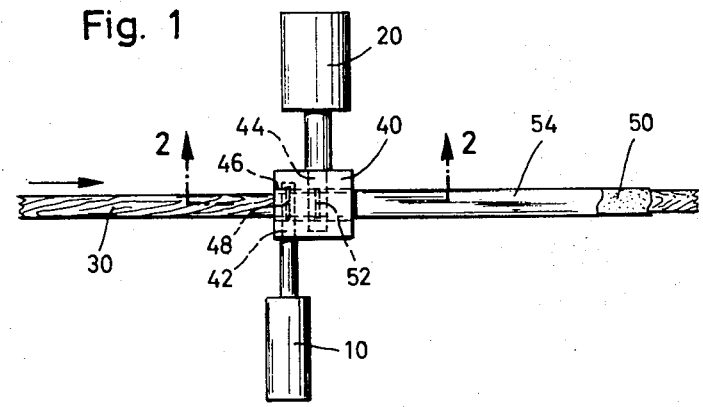

3,544,669
METHOD OF COATING MOISTURE-CONTAINING ARTICLES OF WOOD OR WOOD PRODUCTS
Friedrich Schock, Schorndorf, Wurttemberg, Germany, assignor to Schock & Co., GmbH, Schorndorf, Wurttemberg, Germany
Filed Dec. 6, 1967, Ser. No. 688,405
Claims priority, application Germany, Dec. 10, 1966, Sch 39,948
Int. Cl. B29f 3/10; B44d 1/09, 1/28
U.S. Cl. 264—174
8 Claims

ABSTRACT OF THE DISCLOSURE

A moisture-containing article of wood or wood products is initially coated with a layer of solvent-free thermoplastic heat-sealing adhesive in molten state in an extrusion tool and thereafter applying with the same extrusion tool a second layer of synthetic plastic adherent to the first upon solidification and finally solidifying the second layer to form a coherent article.

BACKGROUND OF THE INVENTION

The present invention relates generally to the coating of articles, and more particularly to a method of coating articles. Still more specifically the invention relates to a method of coating moisture-containing articles, particularly articles which consist of wood or which incorporate wood products.

It is becoming more and more common to coat articles of wood or wood products with synthetic plastic material to enhance their appearance, to protect them and to reduce the need for maintenance. Such articles, it will be understood, may either consist of natural wood or may have been manufactured from wood products or wood by-products. As an example of articles manufactured from wood products or wood by-products it may suffice to mention panels, moldings and other articles consisting of compressed wood chips or wood fibers.

All such articles, whether they be natural-wood articles or items consisting of or manufactured from wood products or wood by-products, contain a certain amount of moisture, which in the case of articles consisting of compressed wood fibers or compressed wood chips is normally on the order of 8–9% of the weight of the article. In the extruding of synthetic plastic materials onto any such articles serious problems have been encountered because, as the molten synthetic plastic material—which is maintained for extrusion purposes of temperatures ranging between 160 and 170 degrees centigrade—is applied to the surfaces of the articles, some of the moisture in the articles turns into steam and forms bubbles beneath the synthetic plastic coating. This is evidently not tolerable, both for aesthetic reasons and because in the region of such bubble formations the synthetic plastic material does not adhere to the surface of the article being coated.

The most immediately obvious approach to rectifying this problem appeared to be to subject the articles to an initial drying process whereby to withdraw all of the moisture, or as much of the moisture as practicable. Articles thus treated were coated with a lacquer consisting of a heat-sealing bonding agent dissolved in a suitable solvent. Upon vaporization of the solvent the articles were then coated with a synthetic plastic material by extruding a layer thereof over the lacquer. Initially this approach appeared to provide a solution to the problem because the synthetic plastic material could now be extruded onto the articles without the formation of steam bubbles. However, over a period of time it became evident that this approach was not satisfactory. Baseboard moldings which had been coated in this manner and which had been nailed in place, reattracted moisture from the ambient air because neither the layer of lacquer nor the coating of synthetic plastic material were completely moisture impervious. Inasmuch as during the initial drying process these moldings had undergone considerable shrinkage as a result of their moisture loss, this shrinking process was reversed as moisture was again attracted into the moldings. The result was a significant expansion of the moldings and it was observed that over a period of only a few months the resulting elongation was so great that the nails with which they were mounted in place were sheared off.

In another attempt at solving this problem it has been proposed to withdraw the steam which develops upon contact of the hot extruded plastic material with the articles to be coated before it can form bubbles. For this reason suitable conduits were provided. This approach has been found unsatisfactory for the same reason as the previous one, namely because the development of steam and the subsequent withdrawal of such steam necessarily results in the withdrawal of moisture from the article to be coated, and the resulting shrinkage of the article will later be reversed by attraction of new moisture into the cellular structure of the material of the article. Consequently, the article will over a period of time expand again and present the problems which have been outlined above.

SUMMARY OF THE INVENTION

The present invention overcomes the disadvantages which have been outlined above.

More particularly, the present invention provides a method for the coating of moisture-containing articles wherein the coating of synthetic plastic material which is extruded onto the article in question will tightly adhere without any formation of bubbles, and wherein furthermore the subsequent development of problems resulting from changes in the moisture content of the coated article is avoided.

I achieve these advantageous results by resorting to my novel method of coating moisture-containing articles, according to which method the moisture-containing article is initially coated with a layer of heat-sealing adhesive in molten state, whereupon a coating of synthetic plastic material is extruded onto this layer.

The use of a heat-sealing bonding agent or adhesive is of course not new, as witness the discussion above in conjunction with prior attempts at solving the problem at hand. However, in accordance with the present invention the heat-sealing adhesive is applied in molten state and therefore is not required to be dissolved in a solvent in the conventional manner, which heretofore was believed to be the only proper manner of application. In other words, it has been found—and surprisingly so—that a heat-sealing bonding agent which is applied in molten state and therefore without resort to solvent materials, will have substantially better adhesion to the surfaces of moisture-containing articles, particularly articles consisting of wood or wood products, than heat-sealing bonding agents which are applied in the presence of a solvent material. This is true even if the bonding agent in both cases is the same.

By making use of this surprising finding it is possible to apply the heat-sealing bonding agent, and thereupon the coating of synthetic plastic material, without effecting any significant change in the moisture content of the article being coated. Thus, the dimensional stability of the article is not affected, either prior or subsequent to the coating process. The problems outlined above are effectively avoided because contraction and later expansion no longer occur, and none of the moisture in the article is driven out in form of steam upon contact of the heated synthetic plastic material with the article, the layer of heat-sealing bonding agent being interposed and preventing this. In fact, the moisture imperviousness of a layer of heat-sealing bonding agent applied in accordance with the invention is so great that the dimensional stability of articles treated as herein disclosed is not affected even if they are subsequently subjected to strong fluctuations in the moisture content of the ambient atmosphere.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat schematic plan view of an apparatus for carrying out the present invention; and
FIG. 2 is a section taken on the line 2—2 of FIG. 1.

DESCRIPTION OF THE PREFERRED EMBODIMENTS

Discussing now the drawing in detail it will be seen that it comprises a first extrusion press 10 for the heat-sealing bonding agent or adhesive, and a second extrusion press 20 for the synthetic plastic material. In the drawing it is assumed that a molding 30 consisting of compressed wood fibers or wood chips, and being advanced in the direction of the arrows in FIGS. 1 and 2, is to have a coating of synthetic plastic material extruded thereabout.

Reference numeral 40 identifies an electrically heated extrusion head of known construction, into which the presses 10 and 20 respectively supply molten bonding agent and molten synthetic plastic material. As is most clearly evident from FIG. 2, the extrusion press 10 supplies molten bonding agent into two channels 42 which are provided in the extrusion head 40. Similarly, the extrusion press 20 supplies molten synthetic plastic material into the two channels 44 which are located downstream of the channels 42, as seen in the direction of movement of the molding 30 through the extrusion head 40. The latter is, of course, provided with a main passage 46 which in this instance is slot-shaped and through which the molding 30 advances, the passage 46 being located symmetrically with reference to the respective pairs of channels 42 and 44.

FIG. 2 shows most clearly that the channels 42 are connected with the main passage 46 by means of conduits 48 which communicate with the main passage 46. It is to be noted that at the points where the conduits 48 communicate with the main passage 46, the latter increases in crosssectional dimension, thereby defining with the molding 30 a clearance whose thickness is preferably on the order of substantially 0.1 to 0.2 millimeter. The molten bonding agent flows out of the conduits 48 into this clearance and coats the molding 30 with a layer 50 whose thickness corresponds to the width of the aforementioned clearance.

The channels 44 also communicate with the main passage 46, but downstream of the point at which the conduits 48 of channels 42 communicate therewith. For this purpose conduits 52 are provided which connect the channels 44 with the main passage 46 a short distance downstream of the point at which the conduits 48 open into the passage 46. This distance may be on the order of approximately 10–12 millimeters. Where the conduits 52 communicate with the main passage 46 the latter is again of increased cross-sectional dimension, just as outlined with reference to the conduits 48. Here, however, the increase is somewhat larger and the clearance between the molding 30 and the inner wall surface of passage 46 has a width of substantially 0.4 and 0.8 millimeter. The plastic material from the channels 44 passes through the conduits 52 and issues into this latter clearance to form therein a coating of synthetic plastic material, identified with reference numeral 54, whose thickness corresponds to the width of the clearance and which overlies and adheres to the layer 50.

It will be readily evident that a variety of modifications is possible without departing from the scope and intent of the present invention. It is clear that the extrusion head can be modified as required to accept articles which are of different size and/or configuration than the molding 30. It is further clear that the arrangement and configuration of the channels 42, 44 and of the conduits 48, 52 can be modified. What is essential and must be remembered at all times, however, is that the heat-sealing adhesive must be applied first, and that it must be applied in molten state without the presence of any solvents.

By way of example and further explanation it is pointed out that a molding strip consisting of compressed wood fibers and having a natural moisture content ranging between 8 and 9% by weight was coated by resorting to the present invention. The layer of heat-sealing adhesive applied in molten state had a thickness of 0.2 millimeter and a coating of synthetic plastic material was extruded over this layer and had a thickness ranging between 0.4 and 0.8 millimeter. The heat-sealing adhesive was a solvent-free mixture, one-third of which was constituted by an ethylene vinylacetate copolymer which is commercially available from the Du Pont Company under the trade name "Elvax 260," and two-thirds of which were constituted by cumarone-indene resin. The bonding agent thus constituted could be worked at a relatively low temperature of approximately 140 degrees centigrade, and this is of particular advantage in the coating of articles consisting of wood or wood products. The advancing speed of the molding was approximately 8 meters per minute. Any thermoplastic synthetic resin, such as a vinyl or acrylic resin, which can be worked at temperatures of approximately 160–170 degrees centigrade, is suitable for the coating which is to be extruded over the layer of heat-sealing bonding agent.

The final product which was obtained in this manner by resorting to the present invention was provided with a coating of synthetic plastic material which was completely free of bubbles and which exhibited unusually good adherence to the carrier, namely the molding strip. Furthermore, the heat-sealing bonding agent mixture described above was found to be so impervious to moisture that the completed molding strip, which was installed as a baseboard in the usual manner, exhibited no dimensional changes at all during observations which were carried out over an extended period of time.

It must still be pointed out that the cumarone-indene resin can be replaced in the aforedescribed mixture with colophonium or with other brittle resins and these will act in the same manner as the cumarone-indene resin by serving as bonding improvers and by "stretching" the mixed polymerisate in the sense of making it go farther. However, good results can also be obtained by simply using the aforementioned ethylene-vinylacetate copolymer as the bonding agent and omitting the additives.

It will be evident that it would be possible to apply the layer of heat-sealing bonding agent in a manner other than by extrusion, for instance by rolling the material onto the article with a heated roller. However, inasmuch as the synthetic plastic material is applied by extrusion in any case, the application of the bonding agent by means of extrusion is the economically most favorable approach. It would furthermore be possible to extrude the layer of heat-sealing bonding agent onto the article to be coated in a first extrusion stage, and thereupon to feed the coated article into an extrusion press for application of the coating of synthetic plastic material in a second extrusion stage. However, in view of the rather high temperatures prevailing in the extrusion press for the synthetic plastic material, which latter must be maintained at temperatures ranging between approximately 160° and 170° centigrade, there is some danger of fouling of the inlet side of the extrusion head. Therefore, while neither this specific approach nor the one just mentioned previously need be ruled out, it is most advantageous to resort to the approach which has been described with reference to the drawing where the layer of heat-sealing bonding agent is extruded onto the article immediately upstream of the point at which the coating of synthetic plastic material is extruded over this layer, such extrusion being effected in a single extruding head.

Without further analysis, the foregoing will so fully reveal the gist of the present invention that others can by applying current knowledge readily adapt it for various applications without omitting features that, from the standpoint of prior art, fairly constitute essential characteristic of the generic or specific aspects of this invention and, therefore, such adaptions should and are intended to be comprehended within the meaning and range of equivalence of the following claims.

What is claimed as new and desired to be protected by Letters Patent is set forth in the appended claims:

1. A method of coating articles of wood or wood products, comprising the first step of extruding in an extrusion tool onto a moisture-containing article a first layer of solvent-free thermoplastic adhesive at elevated temperature and in molten state, for solidification on said article and for adhesively sealing the pores of the same; the second step of extruding in the same extrusion tool onto said first layer a second layer of synthetic plastic material at elevated temperature and in molten state, the said second material being adherent to said first layer upon solidification; and thereafter solidifying said second layer and thereby forming a coherent article.

2. A method as defined in claim 1, wherein said synthetic plastic material is a thermoplastic resin.

3. A method as defined in claim 1, wherein said steps are performed substantially contemporaneously.

4. A method as defined in claim 1, wherein said adhesive is a mixture consisting of substantially 33% mixed polymerisate of ethylene-vinylacetate copolymer, and substantially 67% cumarone-indene resin.

5. A method as defined in claim 2, wherein said second step comprises extruding said first thermoplastic resin at temperatures ranging substantially between 160° and 170° centigrade.

6. A method as defined in claim 1, wherein said layer has a thickness of 0.2 mm.

7. A method as defined in claim 6, wherein said second layer has a thickness of between 0.4 and 0.8 mm.

8. A method as defined in claim 1, wherein said first layer has a predetermined thickness and wherein said second layer has a thickness which is a multiple of said predetermined thickness.

References Cited

UNITED STATES PATENTS

| | | | |
|---|---|---|---|
| 2,928,129 | 3/1960 | Chamberlin et al. | 264—129 |
| 2,979,431 | 4/1961 | Perrault | 264—174 |
| 3,277,225 | 10/1966 | Heard | 264—174 |
| 3,306,766 | 2/1967 | Hathaway et al. | 117—76 |
| 3,404,432 | 10/1968 | White et al. | 264—174 |
| 2,875,093 | 2/1959 | Kempen | 117—116 |

ROBERT F. WHITE, Primary Examiner

J. R. THURLOW, Assistant Examiner

U.S. Cl. X.R.

18—13; 117—57, 148, 161